US012538015B2

(12) United States Patent
Sugimoto

(10) Patent No.: US 12,538,015 B2
(45) Date of Patent: Jan. 27, 2026

(54) IMAGE PROCESSING APPARATUS, IMAGE PROCESSING METHOD, AND NON-TRANSITORY RECORDING MEDIUM

(71) Applicant: NEC Corporation, Tokyo (JP)

(72) Inventor: Kazuo Sugimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 53 days.

(21) Appl. No.: 18/720,713

(22) PCT Filed: Dec. 27, 2021

(86) PCT No.: PCT/JP2021/048531
§ 371 (c)(1),
(2) Date: Jun. 17, 2024

(87) PCT Pub. No.: WO2023/127002
PCT Pub. Date: Jul. 6, 2023

(65) Prior Publication Data
US 2025/0071414 A1    Feb. 27, 2025

(51) Int. Cl.
H04N 23/65 (2023.01)
G06V 40/16 (2022.01)
H04N 23/611 (2023.01)
H04N 23/667 (2023.01)

(52) U.S. Cl.
CPC ......... H04N 23/651 (2023.01); G06V 40/161 (2022.01); H04N 23/611 (2023.01); H04N 23/667 (2023.01)

(58) Field of Classification Search
CPC .. G06V 40/161; G06V 40/16; G07C 9/00563; H04N 23/667; H04N 23/611; H04N 23/651; H04N 7/18; G06T 1/0007; Y02D 10/00; G06F 21/32

USPC ..................................................... 348/333.13
See application file for complete search history.

(56) References Cited

U.S. PATENT DOCUMENTS

| 7,417,551 B2* | 8/2008 | Senga | B60R 25/305 |
| | | | 340/5.83 |
| 9,800,782 B2* | 10/2017 | Kallstrom | H04N 23/651 |
| 10,051,171 B2* | 8/2018 | Kallstrom | H04N 23/661 |
| 10,609,285 B2* | 3/2020 | Holz | H04N 23/61 |

(Continued)

FOREIGN PATENT DOCUMENTS

JP    H10-83487 A    3/1998
JP    2006-259922 A    9/2006

(Continued)

OTHER PUBLICATIONS

Extended European Search Report for EP Application No. 21969886.7, dated on Jan. 3, 2025.

(Continued)

*Primary Examiner* — Pritham D Prabhakher
(74) *Attorney, Agent, or Firm* — Sughrue Mion, PLLC

(57) ABSTRACT

Provided are: an image acquisition unit that acquires an image captured such that a light emitting area in which light is emitted in a dark place is included in an angle of view; a determination unit that determines whether or not to switch a mode of power consumption in accordance with a light emitting state of the light emitting area included in the image; and a switching unit that switches the mode of power consumption in accordance with a determination result of the determination unit.

8 Claims, 6 Drawing Sheets

(56) References Cited

U.S. PATENT DOCUMENTS

| | | | |
|---|---|---|---|
| 10,656,275 B1* | 5/2020 | Bills | G06T 7/70 |
| 12,146,960 B2* | 11/2024 | Sonn | G01S 17/18 |
| 2006/0208882 A1 | 9/2006 | Senga | |
| 2011/0103643 A1* | 5/2011 | Salsman | H04N 23/57 |
| | | | 348/241 |
| 2014/0192206 A1* | 7/2014 | Holz | H04N 23/651 |
| | | | 348/169 |
| 2016/0269613 A1 | 9/2016 | Kallstrom et al. | |
| 2018/0048802 A1 | 2/2018 | Kallstrom et al. | |
| 2019/0004149 A1* | 1/2019 | Mano | G01S 17/89 |
| 2019/0056498 A1* | 2/2019 | Sonn | G01S 7/4865 |
| 2019/0268525 A1* | 8/2019 | Okada | H04N 23/80 |
| 2020/0065572 A1* | 2/2020 | Roberts | H04N 25/00 |
| 2021/0103201 A1* | 4/2021 | Galor Gluskin | H04N 23/71 |

FOREIGN PATENT DOCUMENTS

| | | |
|---|---|---|
| JP | 2008-310480 A | 12/2008 |
| JP | 2010-198207 A | 9/2010 |
| JP | 2013-004490 A | 1/2013 |
| JP | 2016-536868 A | 11/2016 |
| JP | 2020-008917 A | 1/2020 |

OTHER PUBLICATIONS

International Search Report for PCT Application No. PCT/JP2021/048531, mailed on Feb. 8, 2022.
JP Office Communication for JP Application No. 2023-570499, mailed on Jul. 29, 2025 with English Translation.

* cited by examiner

IMAGE PROCESSING APPARATUS, IMAGE PROCESSING METHOD, AND NON-TRANSITORY RECORDING MEDIUM

This application is a National Stage Entry of PCT/JP2021/048531 filed on Dec. 27, 2021, the contents of all of which are incorporated herein by reference, in their entirety.

TECHNICAL FIELD

This disclosure relates to technical fields of an image processing apparatus, an image processing method, and a recording medium.

BACKGROUND ART

Patent Literature 1 describes: executing an authentication repeating process of repetitively executing an authentication process after determining, by an authentication process, conformity of control of an object authentication device carrying out the authentication process of authenticating an object on the basis of a photograph image of the object photographed by a photographing means, a repeating stop instruction receiving process of receiving a repeating stop instruction for stopping repeating of the authentication process by an input means, an authenticity determining process of carrying out authenticity determination by comparing the received repeating stop instruction with a preregistered normal instruction, and a repeating stopping process of stopping the authentication repeating process when a determination result of the authenticity determining process is true; improving reliability of security with respect to impersonation/spoofing; and suppressing electric power consumption. Furthermore, Patent Literature 2 describes the following matters: an intruder detection apparatus is configured such that monitoring is performed by a black-and-white monitor camera capable of shooting only a portion provided within an intrusion prohibited area which has a transparent window surface as a part and irradiated with infrared rays; in the intruder detection apparatus, an infrared ray irradiator for irradiating the infrared rays along near the transparent window surface part at the outside of the intrusion prohibited area is provided; and in a case where a person irradiated with the infrared rays is imaged by the black-and-white monitor camera and the presence of an imaged person is detected by image processing, and then, in a case where it is determined that the person is in a state of staying for a predetermined time, the person is determined to be an intruder. Furthermore, Patent Literature 3 describes: acquiring feature quantity information as identification information for security from images taken by cameras; utilizing the feature quantity information for an authentication process for area security; and determining the area security in a designated area on the basis of the feature quantity information.

CITATION LIST

Patent Literature

Patent Literature 1: JP2006-259922A
Patent Literature 2: JPH10-83487A
Patent Literature 3: JP2010-198207A

SUMMARY

Technical Problem

It is an example object of this disclosure to provide an image processing apparatus, an image processing method, and a recording medium that aim to improve the techniques/technologies disclosed in Citation List.

Solution to Problem

An image processing apparatus according to an example aspect of this disclosure includes: an image acquisition unit that acquires an image captured such that a light emitting area in which light is emitted in a dark place is included in an angle of view; a determination unit that determines whether or not to switch a mode of power consumption in accordance with a light emitting state of the light emitting area included in the image; and a switching unit that switches the mode of power consumption in accordance with a determination result of the determination unit.

An image processing method according to an example aspect of this disclosure includes: acquiring an image captured such that a light emitting area in which light is emitted in a dark place is included in an angle of view; determining whether or not to switch a mode of power consumption in accordance with a light emitting state of the light emitting area included in the image; and switching the mode of power consumption in accordance with a determination result.

A recording medium according to an example aspect of this disclosure is a recording medium on which a computer program that allows a computer to execute an image processing method is recorded, the image processing method including: acquiring an image captured such that a light emitting area in which light is emitted in a dark place is included in an angle of view; determining whether or not to switch a mode of power consumption in accordance with a light emitting state of the light emitting area included in the image; and switching the mode of power consumption in accordance with a determination result.

DESCRIPTION OF EXAMPLE EMBODIMENTS

Hereinafter, an image processing apparatus, an image processing method, and a recording medium according to example embodiments will be described with reference to the drawings.

1: FIRST EXAMPLE EMBODIMENT

An image processing apparatus, an image processing method, and a recording medium according to a first example embodiment will be described. The following describes the image processing apparatus, the image processing method, and the recording medium according to the first example embodiment, by using an image processing apparatus 1000 to which the image processing apparatus, the image processing method, and the recording medium according to the first example embodiment are applied.

[1-1: Configuration of the Image Processing Apparatus 1000]

Figure 1:
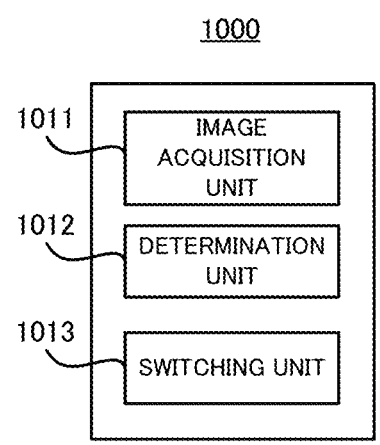
FIG. 1 is a block diagram illustrating a configuration of a face recognition apparatus in a first example embodiment.

With reference to FIG. 1, a configuration of the image processing apparatus 1000 in the first example embodiment will be described. FIG. 1 is a block diagram illustrating the configuration of the image processing apparatus 1000 in the first example embodiment.

As illustrated in FIG. 1, the image processing apparatus 1000 includes an image acquisition unit 1011, a determination unit 1012, and a switching unit 1013. The image acquisition unit 1011 acquires an image captured such that a light emitting area in which light is emitted in a dark place is included in an angle of view. The determination unit 1012 determines whether or not to switch a mode of power consumption, in accordance with a light emitting state of the light emitting area included in the image. The switching unit 1013 switches the mode of power consumption in accordance with a determination result of the determination unit 1012.

[1-2: Technical Effect of Image Processing Apparatus 1000]

The image processing apparatus 1000 in the first example embodiment is capable of switching the mode of power consumption in accordance with the light emitting state of the light emitting area included in the image captured such that the light emitting area in which light is emitted in the dark place is included in the angle of view. That is, the image processing apparatus 1000 is capable of changing the power consumption by providing a simple mechanism that is the light emitting area in an angle of view of the camera.

2: SECOND EXAMPLE EMBODIMENT

Hereinafter, with reference to the drawings, an image processing apparatus, an image processing method, and a recording medium according to a second example embodiment will be described. The following describes the image processing apparatus, the image processing method, and the recording medium according to the second example embodiment, by using a face recognition apparatus 10 to which the image processing apparatus, the image processing method, and the recording medium according to the second example embodiment are applied.

[2-1: Outline of Unlocking System 1]

Figure 2:
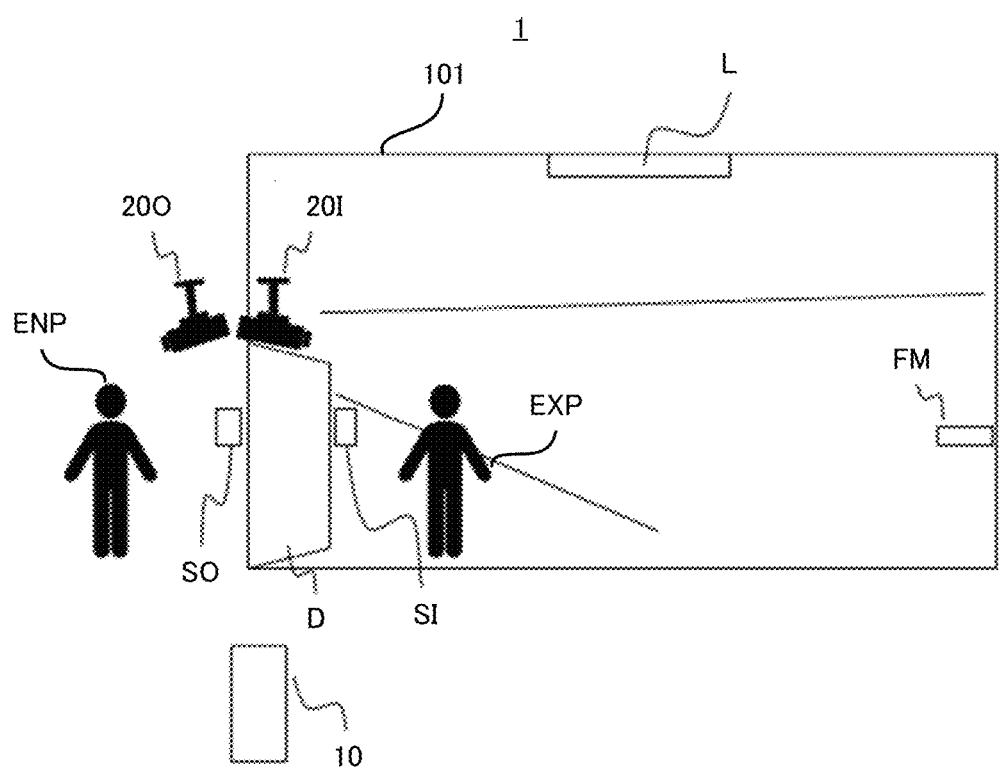
FIG. 2 is a schematic diagram of an unlocking system in a second example embodiment.

First, an outline of an unlocking system 1 in the present example embodiment will be described. FIG. 2 is a schematic diagram of the unlocking system 1 in the present example embodiment. The unlocking system 1 includes a door D, the face recognition apparatus 10, an outside camera 200, an inside camera 201, an outside switch SO, an inside switch SI, lighting L, and a fluorescent marker FM. The door D is provided at an entrance of a room 101 that is a certain space partitioned in a building, and by closing the entrance, the room 101 and an outside may be shut off. The door D may be locked in a case where there is no entering person ENP and no leaving person EXP, so that the room 101 and the outside may be shut off. When unlocked, the door D may enable access between the room 101 and the outside by the entering person ENP and the leaving person EXP. The face recognition apparatus 10 may control unlocking and locking of the door D.

Above and near the door D inside the room 101, an inside camera 201 for acquiring an image used for face recognition may be provided. The inside camera 201 may acquire a face image of the leaving person EXP. Furthermore, an outside camera 200 for acquiring an image used for face recognition may be provided above and near the door D outside the room 101. The outdoor 200 may acquire a face image of the entering person ENP.

The face recognition apparatus 10 may authenticate the entering person ENP and the leaving person EXP. The face recognition apparatus 10 may perform face recognition using the face images of the entering person ENP and the leaving person EXP. The face recognition apparatus 10 may perform face recognition using the face image of the entering person ENP captured by the outside camera 200, or face recognition using the face image of the leaving person EXP captured by the inside camera 201. The face recognition apparatus 10 may acquire the image from the outside camera 200 when the entering person ENP enters the room 101, and may acquire the image from the inside camera 201 when the leaving person EXP leaves the room 101. The face recognition apparatus 10 may perform face recognition processing by using the acquired images, and may unlock a key of the door D when the face recognition is successful, so as to enable access between the room 101 and the outside by the entering person ENP and the leaving person EXP.

At a ceiling of the room 101, the lighting L may be provided. On a wall near the door D in the room 101, an inside switch SI may be provided. Furthermore, on a wall near the door D outside the room 101, an outside switch SO may be provided. The outside switch SO and the inside switch SI may be an instruction input mechanism for switching between a lights-on/on state and a lights-out/off state of the lighting L. For example, the entering person ENP may turn on the lighting L by operating the outside switch SO. Furthermore, the leaving person EXP may turned off the lighting L by operating the inside switch SI.

[2-2: Outline of Image I Used for Face Recognition Operation and Power Saving Operation]

Figure 3:
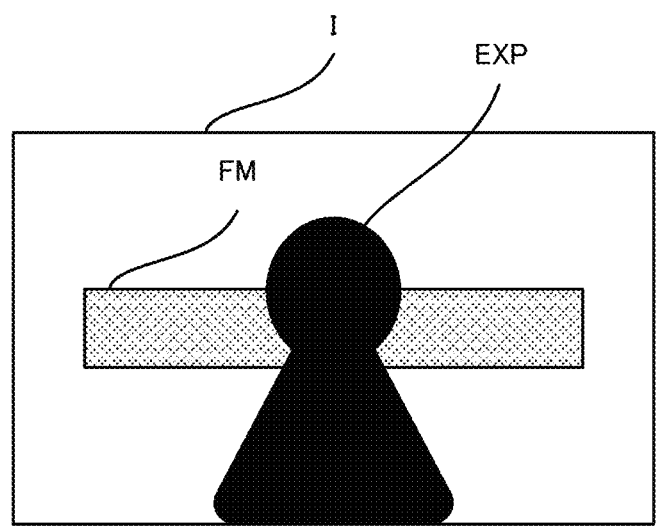
FIG. 3 is a schematic diagram of an image acquired by a face recognition apparatus in the second example embodiment.
Figure 4:
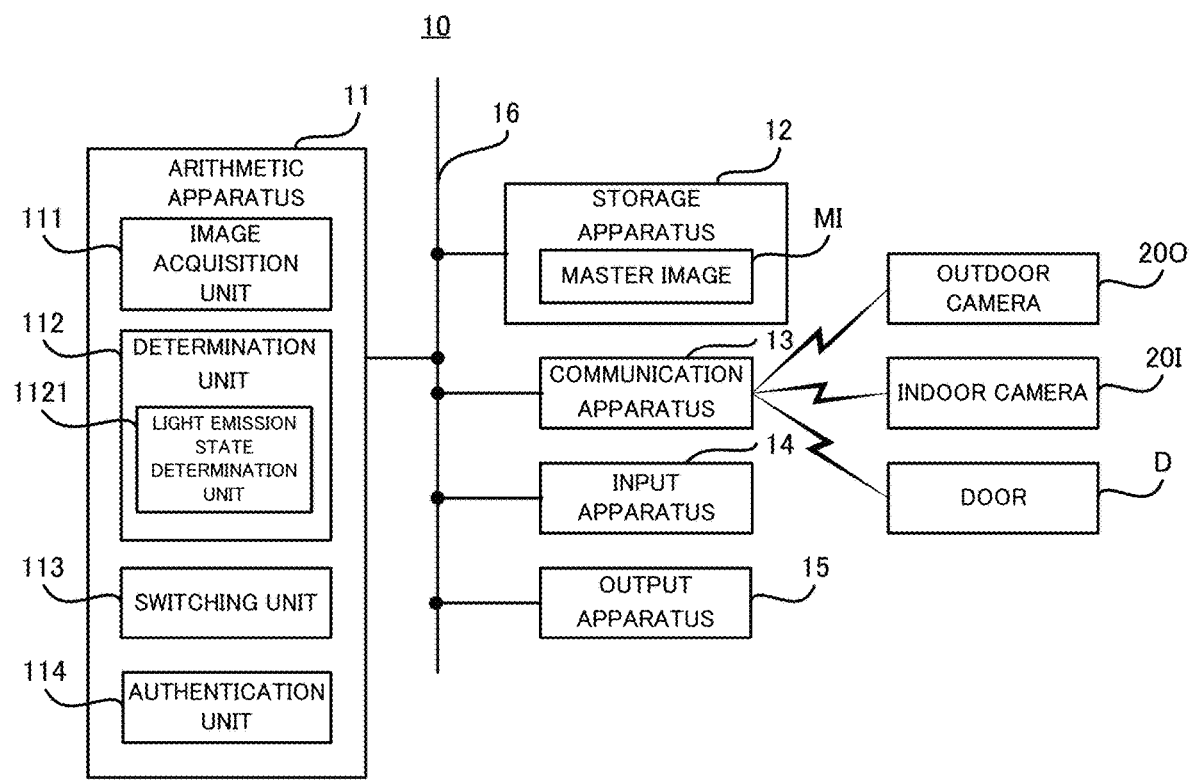
FIG. 4 is a block diagram illustrating a configuration of the face recognition apparatus in the second example embodiment.

With reference to FIG. 3, an outline of an image I used for a face recognition operation and a power saving operation in the present example embodiment will be described. FIG. 3 illustrates an image I used for the face recognition operation and the power saving operation in the present example embodiment. The image I may be an image captured by the inside camera 201. In a case where there is the leaving person EXP who is about to leave the room 101, the inside 201 may capture the image I to include at least a face of the leaving person EXP.

As illustrated in FIG. 3, the inside camera 201 captures the image I such that the fluorescent marker FM serving as the light emitting area in which light is emitted in the dark place is included in the angle of view. A horizontal width of the fluorescent marker FM may occupy a predetermined ratio or more of a horizontal width of the image I.

The fluorescent marker FM may be provided in a constant range, such as the wall of the room 101, to be in an imaging range of the inside camera 201. The fluorescent marker FM may be provided by applying a fluorescent paint including afterglow phosphor, on an area included in the angle of view of the inside camera 201. The fluorescent marker FM may be provided with a fluorescent sticker attached to the area included in the angle of view of the inside camera 201. As illustrated in FIG. 3, the fluorescent marker FM may be provided so as to be captured horizontally at a level near the center on the image captured by the inside camera 201. The fluorescent marker FM may be provided such that the leaving person EXP who is an authentication target is captured in a central part of the fluorescent marker FM in the angle of view of the inside camera 201.

[2-3: Configuration of Face Recognition Apparatus 10]

With reference to FIG. 3, a configuration of the face recognition apparatus 10 according to the present example embodiment will be described. FIG. 3 is a block diagram illustrating the configuration of the face recognition apparatus 10 according to the present example embodiment.

As illustrated in FIG. 3, the face recognition apparatus 10 includes an arithmetic apparatus 11 and a storage apparatus 12. In addition, the face recognition apparatus 10 may include a communications apparatus 13, an input apparatus 14, and an output apparatus 15. The face recognition apparatus 10, however, may not include at least one of the communication apparatus 13, the input apparatus 14, and the output apparatus 15. The arithmetic apparatus 11, the storage apparatus 12, the communication apparatus 13, the input apparatus 14, and the output apparatus 15 may be connected through a data bus 16.

The arithmetic apparatus 11 includes at least one of a CPU (Central Processing Unit), a GPU (Graphics Processing Unit), and a FPGA (Field Programmable Gate Array), for example. The arithmetic apparatus 11 reads a computer program. For example, the arithmetic apparatus 11 may read a computer program stored in the storage apparatus 12. For example, the arithmetic apparatus 11 may read a computer program stored by computer-readable and non-transitory recording medium, by using a not-illustrated recording medium reading apparatus provided in the face recognition apparatus 10 (e.g., the input apparatus 14 described later). The arithmetic apparatus 11 may acquire (i.e., download or read) a computer program from a not-illustrated apparatus disposed outside the face recognition apparatus 10, through the communication apparatus 13 (or another communication apparatus). The arithmetic apparatus 11 executes the read computer program. Consequently, a logical functional block for performing an operation to be performed by the face recognition apparatus 10 is realized or implemented in the arithmetic apparatus 11. That is, the arithmetic apparatus 11 is allowed to function as a controller for realizing or implementing the logical function block for performing an operation (in other words, processing) to be performed by the face recognition apparatus 10.

FIG. 3 illustrates an example of the logical functional block realized or implemented in the arithmetic apparatus 11 to perform the face recognition operation and the power saving operation. As illustrated in FIG. 3, an image acquisition unit 111 that is a specific example of the "image acquisition unit", a determination unit 112 that is a specific example of the "determination unit", a switching unit 113 that is a specific example of the "switching unit", and an authentication unit 114 that is a specific example of the "authentication unit" are realized or implemented in the arithmetic apparatus 11. The determination unit 112 may include a light emitting state determination unit 1121 that determines the light emitting state.

Details of operation of each of the image acquisition unit 111, the determination unit 112, the switching unit 113, and the authentication unit 114 will be described later with reference to FIG. 6. The arithmetic apparatus 11, however, may not include the authentication unit 114.

The storage apparatus 12 is configured to store desired data. For example, the storage apparatus 12 may temporarily store computer program to be executed by the arithmetic apparatus 11. The storage apparatus 12 may temporarily store data that are temporarily used by the arithmetic apparatus 11 when the arithmetic apparatus 11 executes the computer program. The storage apparatus 12 may store data that are stored by the face recognition apparatus 10 for a long time. The storage apparatus 12 may include at least one of a RAM (Random Access Memory), a ROM (Read Only Memory), a hard disk apparatus, a magneto-optical disk apparatus, a SSD (Solid State Drive), and a disk array apparatus. That is, the storage apparatus 12 may include a non-transitory recording medium. The storage apparatus 12 may store a master image MI used for an authentication operation by the authentication unit 114.

The communication apparatus 13 is configured to communicate with an apparatus external to the face recognition apparatus 10 through a not-illustrated communication network. The communication apparatus 13 may be configured to communicate with the inside camera 201, the outside camera 200, and the door D.

The input apparatus 14 is an apparatus that receives an input of information to the face recognition apparatus 10 from an outside of the face recognition apparatus 10. For example, the input apparatus 14 may include an operating apparatus (e.g., at least one of a keyboard, a mouse, and a touch panel) that is operable by an operator of the face recognition apparatus 10. For example, the input apparatus 14 may include a reading apparatus that is configured to read information recorded as data on a recording medium that is externally attachable to the face recognition apparatus 10.

The output apparatus 15 is an apparatus that outputs information to the outside of the face recognition apparatus 10. For example, the output apparatus 15 may output information as an image. That is, the output apparatus 15 may include a display apparatus (a so-called display) that is configured to display an image indicating the information that is desirably outputted. For example, the output apparatus 15 may output information as audio/sound. That is, the output apparatus 15 may include an audio apparatus (a so-called speaker) that is configured to output audio/sound. For example, the output apparatus 15 may output information onto a paper surface. That is, the output apparatus 15 may include a print apparatus (a so-called printer) that is configured to print desired information on the paper surface.

[2-4: Outline of Determination Operation of Determination Unit 112]

Figure 5:
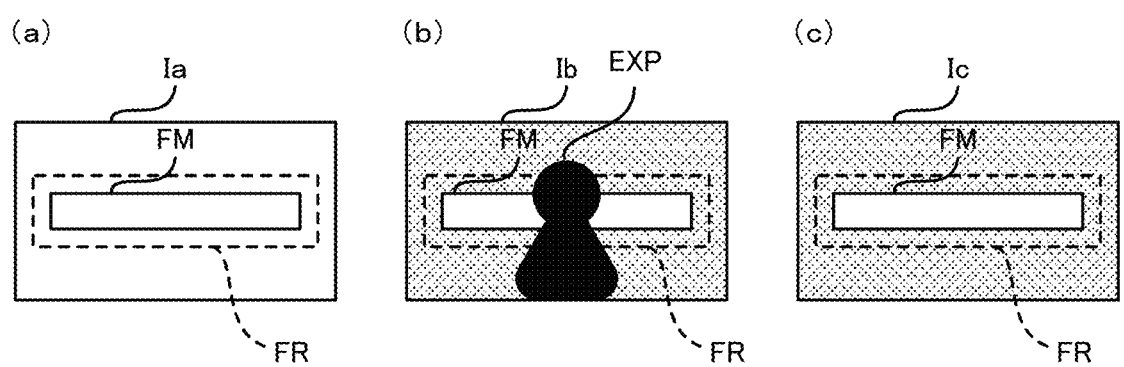
FIG. 5 is a conceptual diagram of a determination operation performed by the face recognition apparatus in the second example embodiment.

FIG. 5 illustrates an example of the image I used by the determination unit 112 for a determination operation. Furthermore, [Table 1] below indicates the mode of power consumption corresponding to the state of the room 101.

TABLE 1

|  | Image Ia | Image Ib | Image Ic |
|---|---|---|---|
| Room state | Lights on and Currently in the room | Lights out and Currently out of the room | Lights out and Already left |
| Fluorescent area ratio | 0% | <25% | ≥25% |
| Mode of power consumption | First mode | First mode | Second mode |

The determination unit 112 determines whether or not the face recognition processing is necessary, in accordance with a light emitting state of the fluorescent marker FM. FIG. 5(a) illustrates an image Ia in a case where the lighting L is on. Since the lighting L is on and it is in a bright place, the fluorescent marker FM captured in the image Ia does not emit light. Thus, a ratio of the fluorescent marker FM in a fluorescent area FR captured in the image Ia is 0%. The fluorescent area FR is an area including the fluorescent marker FM in the image Ia. As illustrated in a left column of [Table 1], a case where a state of the room 101 is a state where the lighting L is on, may be considered to be a case where there is a person in the room 101. The mode of power consumption may remain in a first mode, a frame rate of the camera may be relatively high, and the face recognition operation by authentication unit 114 may be continued.

FIG. 5 (*b*) illustrates an image Ib in a case where the lighting L is off. Since the lighting L is off and it is in the dark place, the fluorescent marker FM captured in the image Ib emits light. In addition, the leaving person EXP is currently out of the room, and the leaving person EXP is captured in the the image Ib. Thus, the ratio of the fluorescent marker FM in the fluorescent area FR captured in the image Ib is less than a first threshold. The first threshold may be, for example, 25%. As illustrated in a middle column of [Table 1], a case where the state of the room 101 is a state where the lighting L is off and the leaving person EXP is captured in the image I, may be considered to be a case where the authentication operation of authenticating the leaving person EXP is necessary. The mode of power consumption may remain in the first mode, the frame rate of the camera may be relatively high, and the face recognition operation by the authentication unit 114 may be continued.

FIG. 5 (*c*) illustrates an image Ic in a case where the lighting L is off. Since the lighting L is off and it is in the dark place, the fluorescent marker FM captured in the image Ic emits light. In addition, since there is no leaving person EXP, the leaving person EXP is not captured in the image Ic. Thus, the ratio of the fluorescent marker FM in the fluorescent area FR captured in the image Ic is greater than or equal to the first threshold. The first threshold may be, for example, 25%. As illustrated in a right column of [Table 1], a case where the state of the room 101 is a state where the lighting L is off state and the leaving person EXP is not captured in the image I, may be considered to be a case where the authentication operation of authenticating the leaving person EXP is not necessary. The mode of power consumption may be switched to a second mode, the frame rate of the camera may be switched to be relatively low, and the face recognition operation by the authentication unit 114 may be stopped.

The determination unit 112 may determine whether or not the authentication processing is necessary, from an area in which light is emitted in the fluorescent area FR. The determination unit 112 may determine whether or not the authentication processing is necessary, in accordance with a ratio of an area that is brighter than the surroundings and that is included in the fluorescent area FR. For example, in a case where the lighting L is on, the fluorescent area FR is uniformly bright, and thus, the area brighter than the surroundings is 0%. For example, in a case where the lighting L is off and there is no obstruction between the inside camera 201 and the fluorescent marker FM, an area of the fluorescent marker FM included in the fluorescent area FR is brighter than the surroundings. For example, in a case where the lighting L is off and there is an obstruction between the inside camera 201 and the fluorescent marker FM, for example, in a case where there is the leaving person EXP, a part of the area of the fluorescent marker FM included in the fluorescent area FR is blocked by the leaving person EXP, and the ratio of the area brighter than the surrounding is reduced, as compared with in a case where there is no leaving person EXP.

The first threshold, exemplified as 25%, may be defined in accordance with a ratio at which the fluorescent marker FM is hidden when a person stands in front of the inside camera 201. The first threshold may be any value that is adjusted in accordance with the state of the room 101, a range that can be captured in the angle of view by the imaging of the inside camera 201, and a range in which the fluorescent marker FM is provided.

[2-5: Power Saving Operation and Face Recognition Operation Performed by Face Recognition Apparatus 10]

Figure 6:
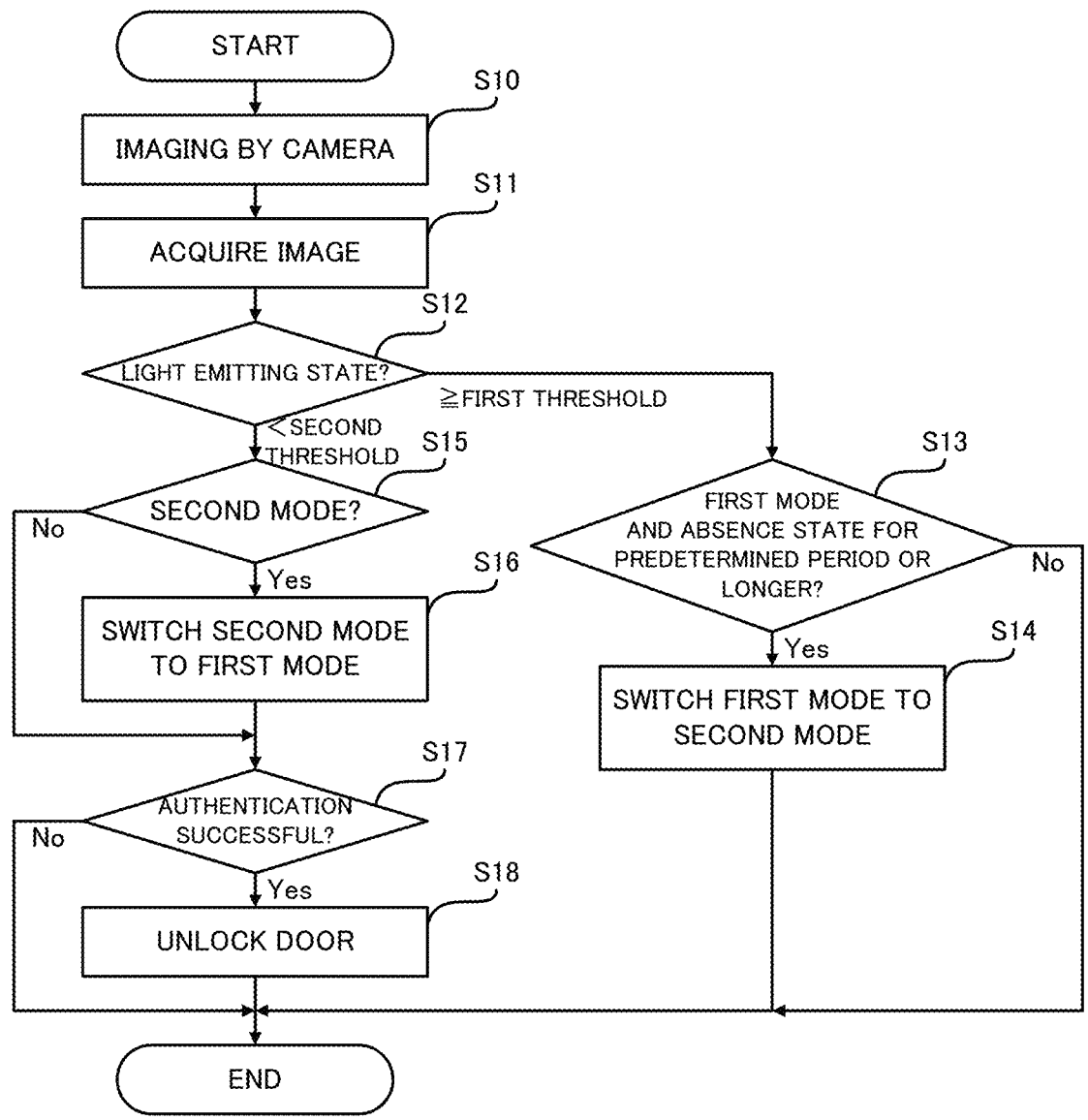
FIG. 6 is a flowchart illustrating a flow of a power saving operation and a face recognition operation performed by the face recognition apparatus in the second example embodiment.

With reference to FIG. 6, the power saving operation and the authentication operation performed by the face recognition apparatus 10 in the present example of example embodiment will be described. FIG. 6 is a flowchart illustrating a flow of the power saving operation and the authentication operation performed by the face recognition apparatus 10 in the present example embodiment. The flowchart illustrated in FIG. 6 illustrates the operation performed for each frame.

As illustrated in FIG. 6, the image I is captured such that the fluorescent marker FM is included in the angle of view (step S10). The image acquisition unit 111 acquires the image I captured such that the fluorescent marker FM is included in the angle of view (step S11). The image acquired by the image acquisition unit 111 may be used by the determination unit 112 to determine whether or not there is a person in the room, before the face recognition processing is performed by the authentication unit 114.

The determination unit 112 determines whether or not to switch the mode of power consumption, in accordance with the light emitting state of the fluorescent marker FM included in the image I (step S12). The light emitting state determination unit 1121 may determine whether a size of the fluorescent marker FM included in the image I is greater than or equal to the first threshold, or is less than the second threshold. The light emitting state determination unit 1121 may determine whether the ratio of the fluorescent marker FM included in the image I is greater than or equal to the first threshold, or is less than the second threshold. That is, the light emitting state determination unit 1121 may determine the light emitting state on the basis of a relative size of the fluorescent marker FM to the image I. The light emitting state determination unit 1121 may determine whether the number of pixels of an image of the fluorescent marker FM included in the image I or the like is greater than or equal to the first threshold, or is less than the second threshold. That is, the light emitting state determination unit 1121 may determine the light emitting state on the basis of an absolute size of the fluorescent marker FM. As illustrated in FIG. 5, the determination unit 112 may determine whether the ratio of the fluorescent marker FM in the fluorescent area FR included in the image I is greater than or equal to the first threshold, or is less than the second threshold. Since the determination processing has a relatively lighter load than that of the authentication processing, the determination unit 112 may perform the determination processing before the face recognition processing by the authentication unit 114. The determination unit 112 may determine whether or not there is a person in the room 101, in accordance with the light emitting state of the fluorescent marker FM included in the image I. For example, when the ratio of the fluorescent marker FM included in the fluorescent area FR is greater than or equal to the first threshold, the determination unit 112 may determine that there is no one in the room 101. Furthermore, the determination unit 112 may determine whether the lighting L is on or off, in accordance with the light emitting state of the fluorescent marker FM. Furthermore, the determination unit 112 may detect an operation by the leaving person EXP for the inside switch SI, or an operation by the entering person ENP for the outside switch SO, and may determine whether the lighting L is on or off. When the ratio of the fluorescent marker FM included in the image I is greater than or equal to the first threshold, the determination unit 112 may determine to switch the mode of power consumption, from the first mode to the second mode in which power consumption is less than that in the first mode.

When the ratio of the fluorescent marker FM is greater than or equal to the first threshold (the step S12: ≥first threshold), the switching unit 113 determines whether a period in which the mode of power consumption is the first mode and the ratio of the fluorescent marker FM is greater than or equal to the first threshold, is greater than or equal to a predetermined period (step S13). When the period in which the mode of power consumption is the first mode and the ratio of the fluorescent marker FM is greater than or equal to the first threshold, is greater than or equal to the predetermined period (the step S13: Yes), the switching unit 113 switches the mode of power consumption (step S14). The switching unit 113 may switch the mode of power consumption from the first mode to the second mode. The switching unit 113 may stop the face recognition operation by the authentication unit 114, in the second mode. That is, when the determination unit 112 determines that the lighting L is off and there is no one in the room 101, the face recognition processing by the authentication unit 114 may be omitted. As a consequence, the high-load face recognition processing is not performed, so that the power consumption is reduced and power saving can be realized. The frame rate of the camera in the second mode may be lower than the that of the camera in the first mode. That is, when the determination unit 112 determines that the lighting L is off and there is no one in the room 101, the frame rate of the camera may be lowered. By this, the power consumption in the unlocking system 1 is suppressed/reduced and the power saving can be realized. When the frame rate of the camera is lowered, images before and after the entering person ENP and the leaving person EXP pass through, may be acquired, and the entering person ENP and the leaving person EXP may be missed. Therefore, a lower limit of the frame rate may be set on the basis of the angle of view of the camera and moving speed of the entering person ENP and the leaving person EXP. The lower limit of the frame rate may be set on the basis of a length of the fluorescent marker in the angle of view of the camera and the moving speed of the entering person ENP and the leaving person EXP. Average moving speed of the entering person ENP and the leaving person EXP may be used.

On the other hand, when the ratio of the fluorescent marker FM is less than the second threshold (the step S12: <second threshold), the switching unit 113 determines whether or not the mode of the power consumption is the second mode (step S15). When the mode of power consumption is the second mode (the step S15: Yes), the switching unit 113 switches the mode of power consumption (step S16). The switching unit 113 may switch the mode of power consumption from the second mode to the first mode. The frame rate of the camera in the first mode may be higher than that of the camera in the second mode. The frame rate of the camera in the first mode may be a frame rate suitable for the face recognition processing. When switching the mode of power consumption to the first mode, the switching unit 113 may start the face recognition operation performed by the authentication unit 114. The second threshold may be the same value as that of the first threshold, may be a different value, or may be defined depending on an environment. The second threshold may be, for example, 25%.

The authentication unit 114 performs the face recognition operation using the face image included in an angle of view of image I. The authentication unit 114 may perform face detecting processing, feature quantity extraction processing, and collation/verification processing with the master image MI registered in the storage apparatus 12. When the authentication by the authentication unit 114 is successful (step S17: Yes), the face recognition apparatus 10 unlocks the key of the door D (step S18). The face recognition apparatus 10 may transmit a control signal ordering the door D to unlock the key, through the communication apparatus 13. In addition, the face recognition apparatus 10 may transmit a control signal ordering the door D to lock the key when a predetermined time elapses. On the other hand, when the authentication by the authentication unit 114 is failed (the step S17: No), the face recognition apparatus 10 does not unlock the key of the door D, and the key of the door D remains locked.

Note that the face recognition apparatus 10 in the present example embodiment may be applied mainly to a case of authenticating the leaving person EXP who leaves the room 101. In other words, the authentication processing of authenticating the entering person ENP may be performed all the time and the outside camera 200 may be activated all the time. When all people leave the room 101 and the lighting is off in the room, the face recognition apparatus 10 detects that the lighting is off in the room, and determines that there is no one, and when there is no one, the authentication processing of the face recognition apparatus 10 may be stopped to suppress/reduce the power consumption in the unlocking system 1. In addition, since the lighting L is turned on when the entering person ENP enters the room, the face recognition apparatus 10 may restart the face recognition processing by the authentication unit 114.

In the light emitting area, light may be emitted when the lighting L is off. Furthermore, as the light emitting area, for example, a fluorescent lamp that accumulates light or the like may be applied, in addition to applying the fluorescent paint including afterglow phosphor and attaching the fluorescent sticker. In addition, in the above example embodiment, a case where the fluorescent marker FM is drawn horizontally on the wall is exemplified, but it is sufficient that the fluorescent marker FM is provided such that it can be determined that there is a person is in the angle of view of the camera. For example, a plurality of fluorescent stickers may be prepared as the light emitting area such that at least a part of the light emitting area is hidden when there is a person in the angle of view of the camera. The determination unit 112 may determine whether the fluorescent marker FM or fluorescent sticker is hidden by a person, depending on whether the fluorescent marker FM or fluorescent sticker is divided into parts. Furthermore, when a horizontal length of the fluorescent marker FM or fluorescent sticker is changed, the determination unit 112 may determine that there is a person because the fluorescent marker FM or fluorescent sticker is hidden.

The determination unit 112 may compare the ratio of the light emitting area with a third threshold that is different from the first threshold, and the mode of power consumption may have a third mode. That is, when the ratio of the light emitting area included in the image is greater than or equal to the third threshold, the determination unit 112 may determine to switch the mode of power consumption from the first mode to the third mode, and the switching unit may switch the mode of power consumption from the first mode to the third mode. In this case, for example, (1) the frame rate of the camera in the first mode may be higher than that of the camera in the second mode, and the face recognition operation by the authentication unit 114 may be stopped in the third mode, or (2) the frame rate of the camera in the first mode may be higher than that of the camera in the third mode, and the face recognition operation by the authentication unit 114 may be stopped in the second mode. That is, the timing of changing the frame rate of the camera may be different from the timing of stopping the face recognition operation by the authentication unit 114.

[2-5: Technical Effect of Face Recognition Apparatus 10]

The face recognition apparatus 10 in the present example embodiment is capable of switching the mode of power consumption in accordance with the light emitting state of the light emitting area included in the image captured such that the light emitting area in which light is emitted in the dark place is included in the angle of view. That is, the face recognition apparatus 10 is capable of changing the power consumption by providing a simple mechanism that is the light emitting area in the angle of view of the camera. Furthermore, the face recognition apparatus 10 in the present example embodiment switches the mode of power consumption from the first mode to the second mode in which the power consumption is reduced, when the ratio of the light emitting area included in the image is greater than or equal to the first threshold. It is thus possible to realize the suppression/reduction of power consumption.

The face recognition apparatus 10 in the present example embodiment uses the fluorescent marker FM as the light emitting area, and it is thus relatively inexpensive and easy to install the face recognition apparatus 10, as compared with a motion detector, such as an infrared sensor, and it is advantageous in terms of cost. In a case where the motion detector or the like is introduced, introduction cost such as cost of purchasing the detector and cost of construction for installation, is required.

In addition, when a method of counting the number of people in the room, such as increasing a count by 1 when a person enters the room and reducing the count by 1 when a person leaves the room, is employed as a method of determining whether or not there is a person in the room 101, it is hardly possible to accurately grasp a state of presence of a person in the room in a case of tailgating in which a person authenticated when entering the room and another person enter the room at the same time. In contrast, the face recognition apparatus 10 in the present example embodiment is capable of accurately grasping whether or not there is the leaving person EXP who wishes to leave the room 101 even in the case of tailgating.

The authentication in entering and leaving the room 101 is used for both entering and leaving. Especially, in leaving the room from the room 101, the authentication processing is operated all the time even when everyone leaves the room 101 and the lighting L is off in many cases. However, at least in a case where there is no one in the room 101, the authentication processing inside the room 101 is not necessary. Since the face recognition apparatus 10 in the present example embodiment may stop the face recognition processing in a period in which there is no one in the room 101 and the lighting L is off, it is possible to suppress the power consumption. The image processing has a lighter load than that of the face recognition processing. Therefore, the face recognition apparatus 10 determines whether or not there is a person who desires to enter or leave the room 101 by the image processing, and when it can be determined that there is no one, the face recognition apparatus 10 stops the face recognition processing. Since the face recognition processing has a heavier load than that of the image processing, it is possible to reduce a processing load of the system by stopping the authentication processing. That is, it is possible to realize the suppression of the power consumed by the unlocking system 1. In addition, since the frame rate of the camera can be lowered when the necessity of the authentication operation of authenticating the leaving person EXP is reduced, it is possible to further reduce the power consumption. On the other hand, when the face recognition operation is necessary, the face recognition operation is started, so that it is possible to prevent inconvenience of the user.

On the other hand, when the mode of power consumption is switched at high frequency, the power consumption may be increased. According to the face recognition apparatus 10 in the present example embodiment, in a case where a period in which there is no leaving person EXP in the angle of view in the off state, continues for a predetermined period, the mode of power consumption is switched. Therefore, it is possible to prevent the power consumption from being increased.

Furthermore, since a horizontal width of the light emitting area employed by the face recognition apparatus 10 in the present example embodiment accounts for a predetermined ratio or more of the horizontal width of the image, it is possible to accurately determine that the leaving person EXP enters in the angle of view in the off state.

The above example embodiment exemplifies a case where the face recognition apparatus 10 serving as the image processing apparatus includes the authentication unit 114, but a mechanism for performing the face recognition operation may be provided in an apparatus external to the image processing apparatus. That is, the switching unit 113 may switch an operation mode of an external mechanism for performing the authentication operation, through the communication apparatus 13.

3: SUPPLEMENTARY NOTES

With respect to the example embodiment described above, the following Supplementary Notes are further disclosed.

Supplementary Note 1

An image processing apparatus including:
an image acquisition unit that acquires an image captured such that a light emitting area in which light is emitted in a dark place is included in an angle of view;
a determination unit that determines whether or not to switch a mode of power consumption in accordance with a light emitting state of the light emitting area included in the image; and
a switching unit that switches the mode of power consumption in accordance with a determination result of the determination unit.

Supplementary Note 2

The image processing apparatus according to Supplementary Note 1, wherein
the determination unit determines to switch the mode of power consumption from a first mode to a second mode in which power consumption is less than that in the first mode, in a case where a size of the light emitting area included in the image is greater than or equal to a first threshold, and the switching unit switches the mode of power consumption from the first mode to the second mode in accordance with the determination result of the determination unit.

Supplementary Note 3

The image processing apparatus according to Supplementary Note 2, wherein
the image acquisition unit acquires the image from a camera that generates the image by imaging an imaging target area such that the light emitting area is included in an angle of view, and
a frame rate of the camera in the first mode is higher than that of the camera in the second mode.

Supplementary Note 4

The image processing apparatus according to Supplementary Note 2 or 3, further including an authentication unit that performs a face recognition operation using a face image included in the image, wherein
the switching unit stops the face recognition operation by the authentication unit in the second mode.

Supplementary Note 5

The image processing apparatus according to Supplementary Note 4, wherein
the determination unit determines to switch the mode of the power consumption from the second mode to the first mode in a case where the size is less than a second threshold, and
the switching unit starts the face recognition operation by the authentication unit in a case of switching the mode of power consumption to the first mode.

Supplementary Note 6

The image processing apparatus according to any one of Supplementary Notes 2 to 5, wherein the determination unit determines to switch the first mode to the second mode in a case where a period in which the size is greater than or equal to the first threshold, continues for a predetermined period or longer.

Supplementary Note 7

The image processing apparatus according to any one of Supplementary Notes 1 to 6, wherein a horizontal width of the light emitting area accounts for a predetermined ratio or more of a horizontal width of the image.

Supplementary Note 8

An image processing method including:
acquiring an image captured such that a light emitting area in which light is emitted in a dark place is included in an angle of view;
determining whether or not to switch a mode of power consumption in accordance with a light emitting state of the light emitting area included in the image; and
switching the mode of power consumption in accordance with a determination result.

Supplementary Note 9

A recording medium on which a computer program that allows a computer to execute an image processing method is recorded, the image processing method including:
acquiring an image captured such that a light emitting area in which light is emitted in a dark place is included in an angle of view;
determining whether or not to switch a mode of power consumption in accordance with a light emitting state of the light emitting area included in the image; and
switching the mode of power consumption in accordance with a determination result.

At least a part of the constituent components of each of the example embodiments described above can be combined with at least another part of the constituent components of each of the example embodiments described above, as appropriate. A part of the constituent components of each of the example embodiments described above may not be used. Furthermore, to the extent permitted by law, all the references (e.g., publications) cited in this disclosure are incorporated by reference as a part of the description of this disclosure.

This disclosure is not limited to the examples described above and is allowed to be changed, if desired, without departing from the essence or spirit of this disclosure which can be read from the claims and the entire identification. An image processing apparatus, an image processing method, and a recording medium with such changes are also intended to be within the technical scope of this disclosure.

DESCRIPTION OF REFERENCE CODES

1 Unlocking system
1000 Image processing apparatus
10 Face recognition apparatus
1011, 111 Image acquisition unit
1012, 112 Determination unit
1013, 113 Switching unit
114 Authentication unit
ENP Entering person
EXP Leaving person
200 Outside camera
201 Inside camera
D Door
SO Outside switch
SI Inside switch
L Lighting
101 Insides
FM Fluorescent marker
FR Fluorescent area
I Image

What is claimed is:
1. An image processing apparatus comprising:
at least one memory that is configured to store instructions; and
at least one processor that is configured to execute the instructions to:
acquire an image captured such that a light emitting area in which light is emitted in a dark place is included in an angle of view;
determine whether or not to switch a mode of power consumption in accordance with a light emitting state of the light emitting area included in the image;
switch the mode of power consumption in the image processing apparatus in accordance with a determination result; and
acquire the image from a camera that generates the image by imaging an imaging target area such that the light emitting area is included in an angle of view, wherein
a frame rate of the camera in a first mode is higher than that of the camera in a second mode.

2. The image processing apparatus according to claim 1, wherein the at least one processor is configured to execute the instructions to:
  determine to switch the mode of power consumption from the first mode to the second mode in which power consumption is less than that in the first mode, in a case where a size of the light emitting area included in the image is greater than or equal to a first threshold; and
  switch the mode of power consumption from the first mode to the second mode in accordance with the determination result.

3. The image processing apparatus according to claim 2, wherein the at least one processor is configured to execute the instructions to:
  perform a face recognition operation using a face image included in the image; and
  stop the face recognition operation in the second mode.

4. The image processing apparatus according to claim 3, wherein the at least one processor is configured to execute the instructions to:
  determine to switch the mode of the power consumption from the second mode to the first mode in a case where the size is less than a second threshold; and
  start the face recognition operation in a case of switching the mode of power consumption to the first mode.

5. The image processing apparatus according to claim 2, wherein the at least one processor is configured to execute the instructions to determine to switch the first mode to the second mode in a case where a period in which the size is greater than or equal to the first threshold continues for a predetermined period or longer.

6. The image processing apparatus according to claim 1, wherein a horizontal width of the light emitting area accounts for a predetermined ratio or more of a horizontal width of the image.

7. An image processing method comprising:
  acquiring an image captured such that a light emitting area in which light is emitted in a dark place is included in an angle of view;
  determining whether or not to switch a mode of power consumption in accordance with a light emitting state of the light emitting area included in the image;
  switching the mode of power consumption in accordance with a determination result; and
  acquiring the image from a camera that generates the image by imaging an imaging target area such that the light emitting area is included in an angle of view, wherein
  a frame rate of the camera in a first mode is higher than that of the camera in a second mode.

8. A non-transitory recording medium on which a computer program that allows a computer to execute an image processing method is recorded, the image processing method including:
  acquiring an image captured such that a light emitting area in which light is emitted in a dark place is included in an angle of view;
  determining whether or not to switch a mode of power consumption in accordance with a light emitting state of the light emitting area included in the image;
  switching the mode of power consumption in accordance with a determination result; and
  acquiring the image from a camera that generates the image by imaging an imaging target area such that the light emitting area is included in an angle of view, wherein
  a frame rate of the camera in a first mode is higher than that of the camera in a second mode.

* * * * *